(12) United States Patent
Pierri et al.

(10) Patent No.: US 11,675,799 B2
(45) Date of Patent: Jun. 13, 2023

(54) ANOMALY DETECTION SYSTEM

(71) Applicant: International Business Machines Corporation, Armonk, NY (US)

(72) Inventors: Francesco Pierri, Salerno (IT); Ioana Giurgiu, Zurich (CH); Monney Serge, Pully (CH); Mitch Gusat, Langnau a.A. (CH)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 16/866,884

(22) Filed: May 5, 2020

(65) Prior Publication Data
US 2021/0349897 A1 Nov. 11, 2021

(51) Int. Cl.
*G06F 11/34* (2006.01)
*G06F 16/2458* (2019.01)
(Continued)

(52) U.S. Cl.
CPC ........ *G06F 16/2474* (2019.01); *G06F 11/079* (2013.01); *G06F 11/3447* (2013.01);
(Continued)

(58) Field of Classification Search
CPC .... G06F 11/079; G06F 11/07; G06F 11/0751; G06F 11/3447; G06F 11/3452;
(Continued)

(56) References Cited

U.S. PATENT DOCUMENTS 7,369,932 B2 5/2008 Kim
9,122,602 B1 9/2015 Jewell
(Continued)

FOREIGN PATENT DOCUMENTS

| CN | 104216941 A | 10/2017 |
|---|---|---|
| CN | 110059904 A | 7/2019 |
| WO | 2011050091 A2 | 4/2011 |

OTHER PUBLICATIONS

"Performance metrics for resources that run IBM Spectrum Virtualize", IBM, 21 pps., <https://www.ibm.com/support/knowledgecenter/SS5R93_5.2.16/com.ibm.spectrum.sc.doc/tpch_r_metrics_svc.html#tpch_r_metrics_svc.dita_v_response_times>.
(Continued)

*Primary Examiner* — Yolanda L Wilson
(74) *Attorney, Agent, or Firm* — Michael A. Petrocelli (57) ABSTRACT

Aspects of the present invention disclose a method and system for anomaly detection for a data source. The method includes one or more processors identifying unexpected values of monitoring measurands in a monitored time series utilizing an anomaly detection algorithm. A data source provides sensor data, including values of a first group of measurands, which include monitoring measurands. The method further includes determining that values of a second group of one or more of the measurands of a subset of sensor data indicates an anomaly utilizing the anomaly detection algorithm. The method further includes sending anomalous data indicative of the subset of sensor data to a root cause analysis system and receiving corresponding feedback that is indicative of a result of a root cause analysis of the subset of sensor data and comprises a third group of the measurands. The method further includes adapting the anomaly detection algorithm.

20 Claims, 4 Drawing Sheets

(51) Int. Cl.
  *G06N 5/04* (2023.01)
  *G06N 20/00* (2019.01)
  *G06F 11/07* (2006.01)
(52) U.S. Cl.
  CPC .......... *G06F 11/3452* (2013.01); *G06N 5/04* (2013.01); *G06N 20/00* (2019.01)
(58) Field of Classification Search
  CPC . G06F 11/3419; G06N 20/00; G05B 23/0281; G05B 23/0275
  See application file for complete search history.

(56) References Cited

U.S. PATENT DOCUMENTS

| | | | | |
|---|---|---|---|---|
| 9,961,571 | B2* | 5/2018 | Yang | H04W 24/04 |
| 10,102,054 | B2 | 10/2018 | Wolf | |
| 2011/0119374 | A1* | 5/2011 | Ruhl | H04L 43/04 709/224 |
| 2015/0033084 | A1 | 1/2015 | Sasturkar | |
| 2015/0294249 | A1 | 10/2015 | Kaya | |
| 2015/0339263 | A1 | 11/2015 | Abu El Ata | |
| 2016/0246662 | A1 | 8/2016 | Meng | |
| 2016/0359728 | A1 | 12/2016 | Ficara | |
| 2016/0371170 | A1* | 12/2016 | Salunke | G06F 11/302 |
| 2018/0129970 | A1 | 5/2018 | Gottschlich | |
| 2018/0248905 | A1 | 8/2018 | Côté | |
| 2018/0278640 | A1 | 9/2018 | Modani | |
| 2019/0155672 | A1* | 5/2019 | Wang | G06F 11/0709 |
| 2019/0286541 | A1* | 9/2019 | Sobala | G06K 9/6267 |
| 2019/0303258 | A1* | 10/2019 | Kumar | G06F 11/3495 |
| 2019/0317848 | A1 | 10/2019 | Meusel | |
| 2019/0370610 | A1* | 12/2019 | Batoukov | G06F 11/0709 |
| 2020/0293391 | A1* | 9/2020 | Poole | G06F 11/0793 |
| 2021/0073060 | A1 | 3/2021 | Grant | |
| 2021/0081265 | A1* | 3/2021 | Mariyappa | G06F 9/5072 |
| 2022/0092474 | A1* | 3/2022 | Chattopadhyay | G06N 20/00 |

OTHER PUBLICATIONS

Bowman et al., "Generating Sentences from a Continuous Space", Proceedings of the 20th SIGNLL Conference on Computational Natural Language Learning, Aug. 2016, pp. 10-21, <https://doi.org/10.18653/v1/K16-1002>.

D'Avino et al., "Autoencoder with recurrent neural networks for video forgery detection", Electronic Imaging, Media Watermarking, Security, and Forensics 2017, pp. 92-99(8)2017, <https://doi.org/10.2352/ISSN.2470-1173.2017.7.MWSF-330>.

Kathareios et al., "Catch It if You Can: Real-Time Network Anomaly Detection With Low False Alarm Rates", 2017 16th IEEE International Conference on Machine Learning and Applications (ICMLA), Dec. 2017, 6 pps.

Sabokrou et al., "Deep-Cascade: Cascading 3D Deep Neural Networks for Fast Anomaly Detection and Localization in Crowded Scenes", 2017, IEEE Transactions on Image Processing, 26(4), 13 pps., <https://doi.org/10.1109/TIP.2017.2670780>.

Srivastava et al., "Unsupervised Learning of Video Representations using LSTMs", 2015,12 pps., <https://doi.org/citeulike-article-id:13519737>.

U.S. Appl. No. 16/867,292, filed May 5, 2020.

"Tslearn's documentation", Copyright 2017, 2 pps., Romain Tavenard, <https://tslearn.readthedocs.io/en/latest/>.

List of IBM Patents and Patent Applications Treated as Related (Appendix P), filed herewith.

"Performance Event Troubleshooting System", Patent Cooperation Treaty Application No. IB2021053396, filed on May 5, 2020, 41 pages.

Patent Cooperation Treaty PCT, International Search Report, and Written Opinion of the International Searching Authority, dated Aug. 12, 2021, International application No. PCT/IB2021/053396, International filing date Apr. 25, 2021, 7 pages.

* cited by examiner

ANOMALY DETECTION SYSTEM

BACKGROUND OF THE INVENTION

The present invention relates generally to the field of digital computer systems, and more particularly to anomaly detection for a data source.

Petabytes of data are being gathered in public and private clouds, with time series data originating from various data sources, including sensor networks, smart grids, etc. The collected time series data may have an unexpected change or a pattern indicating an anomaly. Monitoring data for recognizing and detecting anomalies in real-time may, for example, prevent such anomalies from accumulating and affecting the efficiency of computer systems.

SUMMARY

Aspects of the present invention disclose a method, computer program product, and system for anomaly detection for a data source. The method includes one or more processors identifying unexpected values of monitoring measurands in a monitored time series utilizing an anomaly detection algorithm. A data source provides sensor data and timestamping of the sensor data as a first set of one or more time series. The sensor data comprises values of a first group of measurands. The monitoring measurands comprising at least part of the first group of measurands. The method further includes one or more processors receiving the first set of time series from the data source. The method further includes one or more processors determining that values of a second group of one or more of the measurands of a subset of the received sensor data indicates an anomaly by executing the anomaly detection algorithm on the received time series. The method further includes one or more processors sending anomalous data indicative of the subset of sensor data to a root cause analysis system. The method further includes one or more processors receiving a root cause analysis feedback from the root cause analysis system. The root cause analysis feedback is indicative of a result of a root cause analysis of the subset of sensor data. The root cause analysis feedback comprises a third group of the measurands. The method further includes one or more processors adapting the anomaly detection algorithm based on a difference between the third groups of measurands and the second groups of measurands.

The present subject matter may enable a dynamically and automatically adaptable anomaly detection method. The present subject matter may improve anomaly detection based on real data (e.g. as data accumulates over time), the accuracy of the anomaly detection may increase. This may be advantageous because what may be viewed initially as an anomaly when the anomaly detection program is initiated, may later be revealed to be a deviation that is not abnormal. The anomaly detection may be performed in real-time and may utilize different anomaly detection techniques.

The present subject matter may seamlessly be integrated with existing root cause analysis systems. For example, the anomaly detection method may be performed with different root cause analysis systems. For example, after adapting the anomaly detection algorithm, the method may be repeated using the adapted anomaly detection algorithm and another root cause analysis system. This may further improve the accuracy of the anomaly detection based on different data and different feedbacks.

BRIEF DESCRIPTION OF THE DRAWINGS

In the following embodiments of the invention are explained in greater detail, by way of example only, making reference to the drawings.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various embodiments provide a root cause analysis method, computer system and computer program product as described by the subject matter of the independent claims. Further advantageous embodiments are described in the dependent claims. Embodiments of the present invention can be freely combined with each other if they are not mutually exclusive.

A time series may, for example, be a sequence of data points, measured typically at successive time instants spaced at uniform time intervals. The time series may comprise pairs or tuples (v, t), where "t" is the time at which value "v" is measured. The values v of time series may be referred to as sensor data. The sensor data of a time series may comprise values v of a measurand. A measurand may be a physical quantity, quality, condition, or property being measured. For example, measurands include one or more of, without limitation, temperature, central processing unit) (CPU) usage, computing load, global mirror secondary write lag (ms/op) etc.

A measurand may for example be the global mirror secondary write lag (ms/op), which is the average number of milliseconds to service a secondary write operation for Global Mirror. The value may not include the time to service a primary write operation. Embodiments of the present invention can monitor the values of the global mirror secondary write lag to identify delays that occurred during the process of writing data to a secondary site (e.g., a detected increase may be a sign for a possible issue).

One or more time series may have values of a same measurand. For example, two temperature sensors at different locations each sending a respective time series that has values of the temperature and associated timestamps. In another example, two or more time series may be used to determine values of a single measurand. For example, a measurand that is the ratio of temperature and pressure may be defined using two time series, one of temperature values and the other of pressure values. In another example, each time series of the received time series has values of a respective distinct measurand. That is, the size of the first set of time series and the first group of measurands is the same, since each measurand of the first group has a respective time series of the first set. The values of a measurand may have a pattern that does not conform to a predefined normal behavior of the values of the measurand, which may be referred to as an anomaly.

The normal behavior of a measurand may be defined by one or more reference or threshold values. In one example, a reference value may be a maximum possible value of a measurand which, when exceeded by a value of the measurand, may indicate an anomaly. In one example, the reference values may comprise a lower and upper limit of an allowed range of values, such that when a value of a measurand is out of the range, the value indicates an anomaly. In another example, the reference values may be values of a function or model that models the variations of the values of the measurand over time. In an additional example, embodiments of the present invention can learn the normal behavior from training data by a machine learning model (e.g. the anomaly detection algorithm may be the machine learning model). The trained machine learning model may be an equation or set of rules that predict an anomaly in input data. The rules may use comparisons with reference values.

The anomaly detection algorithm may be a program (e.g. comprising computer-implementable instructions) that is configured to detect anomalies in values of one or more measurands. Embodiments of the present invention can utilize the anomaly detection algorithm to monitor the values of the monitoring measurands. The monitoring measurands may comprise a part of the first group of measurands or all measurands of the first group. In addition, or alternatively, the monitoring measurands may comprise combinations of measurands of the first group of measurands.

According to one embodiment, the determining that the subset of received sensor data indicates an anomaly comprises: detecting that an overall performance metric descriptive of the monitoring measurands in a given time window indicates an anomaly, using the received sensor data, which has timestamps within the time window for comparing the values of the monitoring measurands with respective reference values, and selecting, based on the comparison result, a subset of the measurands of the monitoring measurands with corresponding values that do not match the reference values. The second group of measurands comprises at least part of said subset of measurands. For example, the second group of measurands comprises said subset of measurands.

For example, the received time series includes sensor data and associated timestamps. The subset of sensor data may include values of the monitoring measurands that have associated timestamps that belong to a given time interval or time window. For example, the subset of sensor data may be values of the monitoring measurands of the last day. The time interval may indicate the duration of an event. The overall performance metric may, for example, be a combination of the monitoring measurands. If the combination exceeds a threshold, then the determination may indicate that an anomaly exists in all or part of the monitoring measurands during the time interval.

Using the overall performance metric may save processing resources in particular if no anomaly exists. For example, instead of systematically checking every monitoring measurand, only one combined value is checked. Some embodiments of the present invention will only perform the detailed check if an anomaly exists with the combined value. The detailed check may indicate that the subset of the measurands have anomalous values in the time interval. For example, the monitoring measurands may be MON1, MON2, . . . MONn. During the time interval [ts, te], the overall performance metric has shown an anomalous behavior. By checking on individual basis MON1 . . . MONn, embodiments of the present invention can determine that only MON2, MON5 and MON9 have anomalous values in the time interval. Thus, the subset of the measurands may comprise measurands MON2, MON5 and MON9.

According to one embodiment, the method further comprises ranking the subset of measurands in accordance with a level of respective differences with the reference values, where "N" highest ranked measurands are the second group of measurands. The number N may be smaller than or equal to the number of items in the subset. For example, if the subset has "M" measurands, then N<=M e.g., N=M/2.

Following the above example, the subset of measurands MON2, MON5 and MON9 may be ranked based on the deviation of each measurand of the subset from a respective reference value in the time interval. For example, the average value of MON2 during the time interval [ts te] deviates by 40% from the respective reference value. The average value of MON4 during the time interval [ts te] deviates by 20% from the respective reference value. The average value of MON9 during the time interval [ts te] deviates by 30% from the respective reference value. Accordingly, this example may result in the following ranking: MON2, MON9 followed by MON5. For example, the N=2 highest ranked measurands may comprise MON2 and MON9. In this example, the second group of measurands may comprise measurands MON2 and MON9. Accordingly, embodiments of the present invention can save processing resources that would otherwise be required to process a non-selected measurand of the subset that has insignificant deviations from the reference value during the time interval e.g. small deviations that lie in an error range.

According to one embodiment, the adapting of the anomaly detection (AD) algorithm comprises: configuring the AD algorithm to identify unexpected values in the monitoring time series and in time series of selected one or more received root cause measurands of the third group of measurands which are not part of the second group of measurands. In one example, the selected one or more received root cause measurands may comprise all measurands of the third group of measurands that are not part of the second group of measurands. In another example, the selected one or more received root cause measurands may comprise user selected measurands of the third group or randomly selected measurands of the third group that are not part of the second group of measurands. In another example, the root cause measurands of the third group of measurands may be provided in association with a ranking. For example, based on reconstruction errors, where the selected one or more received root cause measurands may be the first "L" ranked root cause measurands, wherein L>=1 e.g., L=2.

The anomaly detection algorithm may be configured to provide an anomaly score of a given monitoring measurand to indicate whether the given monitoring measurand has anomalous values or not. Example embodiments of the present invention can determine the anomaly score may be based on the results of comparing the values of the given monitoring measurand and reference values. In addition, embodiments of the present invention can weight the anomaly score by a weight associated with the given monitoring measurand to indicate a first order (e.g. user defined order) of the monitoring measurands (e.g. the first ordered monitoring measurand has the highest weighted score). The root cause analysis feedback can include measurands in a second order. If the first and second orders are different, then the adapting of the anomaly detection algorithm may be performed so that new weights may be assigned to the monitoring measurands, which are indicated in the feedback, indicating use of the second order instead of the first order.

For example, the root cause analysis system may identify that other measurands, which are the cause of the anomaly, are not spotted by the AD algorithm (e.g. because the other measurands were not monitored). In this example, if one or more of the other measurands have not been monitored before by the AD algorithm, then the other measurands may be added to the monitoring measurands so that the other measurands can be checked for future received monitoring time series. That is, the monitoring time series may be updated to further include time series of those other measurands. Thus, improving the accuracy of the AD algorithm so that the AD algorithm can detect the right anomaly.

According to one embodiment, the AD algorithm is configured to use reference values (e.g. the AD algorithm may be a threshold-based anomaly detection algorithm) of the monitoring measurands for identifying unexpected values. Adapting the AD algorithm includes redefining (e.g. releasing) reference values of measurands of the second group which are not part of the third group. For example, the AD algorithm may have too tight of thresholds for some of the measurands, which can lead to false anomaly reports if the root cause analysis system identifies the root cause in only part of the second group of measurands. Following the above example of the second group having measurands MON2 and MON9, if the root cause analysis indicates that only MON9 is the root cause, then the reference values of MON2 may be released to prevent triggering false alerts for future received time series.

According to one embodiment, the anomaly detection algorithm is an autoencoder. The adapting of the anomaly detection algorithm includes retraining the autoencoder. For example, the retraining may be performed by using another training set. The other training set may be obtained using an initial training set that has been previously used to train the autoencoder (e.g. the initial training set may be enhanced by adding more data points). In another example, the retraining may be performed by changing training parameters and/or parameters of the autoencoder.

In one example, the AD algorithm is configured to use reference values of the monitoring measurands for identifying unexpected values, the reference values being thresholds in case the AD algorithm is a threshold-based anomaly detection algorithm. In various example embodiments, the reference values being indicative a normal behavior of each of the monitoring measurands in case in case the AD algorithm is a machine learning based anomaly detection algorithm.

According to one embodiment, the adapting comprises augmenting the number of monitoring time series to be processed by the AD algorithm. In an example embodiment, the AD algorithm may be configured to process the monitoring time series, which are a portion of the first set of time series. This example embodiment may enable the addition of time series to the monitoring series for further executions of the AD algorithm. Following the above example, if the third group of measurands comprises a measurand MONx that is not part of the monitoring measurands MON1, MON2, . . . MONn and the associated time series is not processed by the AD algorithm, then embodiments of the present invention enable adding the time series of MONx to the monitoring time series MON1, MON2, . . . MONn.

According to one embodiment, the anomalous data is indicative of a second set of time series and a time range covering timestamps of the subset of sensor data. The second set of time series may be the time series that are used to monitor the second group of measurands. The second set of time series may be a subset of the first set of time series and a subset of the monitoring time series. Following the above example, the anomalous data may indicate the time range [ts, te] and the time series of the subset of the measurands MON2 and MON9. In various embodiments, the root cause analysis system (RCA) may use the time interval, the measurands MON2 and MON9 and the first time series to determine the root cause of the anomaly. In additional embodiments, the RCA system is configured to receive the first time series.

According to one embodiment, a monitoring measurand of the monitoring measurands includes a measurand of the first group of measurands or a combination of two or more measurands of the first group of measurands. According to another embodiment, each time series of the first set of time series comprises values of a respective measurand. That is the number of measurands in the first group is equal to the number of time series in the first set of time series According to one embodiment, a monitoring method comprises the executing step, sending step, receiving of the root cause analysis feedback step and adapting step, where the receiving of the first set of time series is continuously performed, and where the monitoring method is performed for each received time series during a predefined time period. For example, the first set of time series are received as a stream of data.

The monitoring method may be performed on successive time intervals. For example, the monitoring method may be performed for time series received during time interval [t0 t1], then on time series received in time interval [t1, t2], and so on. In various embodiments, the successive time intervals may or may not have the same duration. For each current time interval, the monitoring method may use the adapted AD algorithm of the time interval immediately preceding the current time interval. In another example, the monitoring method may be performed on accumulated data. For example, the monitoring method may be performed for time series received during time interval [t0 t1], then on time series received in time interval [t0, t2], and so on.

According to one embodiment, the method further includes using the adapted AD algorithm for execution of the monitoring method. According to a further embodiment, the method further includes adapting or updating the root cause analysis system using the anomalous data. As with the anomaly detection system, the root cause analysis system may be configured to receive the first set of time series from the data source. The root cause analysis system may be configured to search for root causes of problems in the received time series using a rules engine database of anomalies. The rules engine database of anomalies includes entries, where each entry of the entries is descriptive of an anomaly.

For example, each entry of the entries includes values of attributes of a respective anomaly. For example, the attributes of an anomaly may include the number of time series involved in the anomaly, the order of the measurands involved in the anomaly, etc. For example, the measurands involved in an anomaly may be ordered in accordance with their reconstruction errors (e.g. the first ordered measurand has the highest reconstruction error). The root cause analysis system may be adapted by updating the rules engine database. The updating process may enable to improve the root cause identification. In one example, a user may be prompted for adapting the root cause analysis system based on the anomalous data. The user may provide inputs enabling the update or adaptation of the root cause analysis system.

According to one embodiment, the method further includes repeating the monitoring method, where in each iteration the root cause analysis feedback is received from the last updated root cause analysis system. The monitoring method may for example be repeated for a predefined number of times (e.g. 10 times). In another example, the monitoring method may be repeated upon receiving further first time series data.

Figure 1:
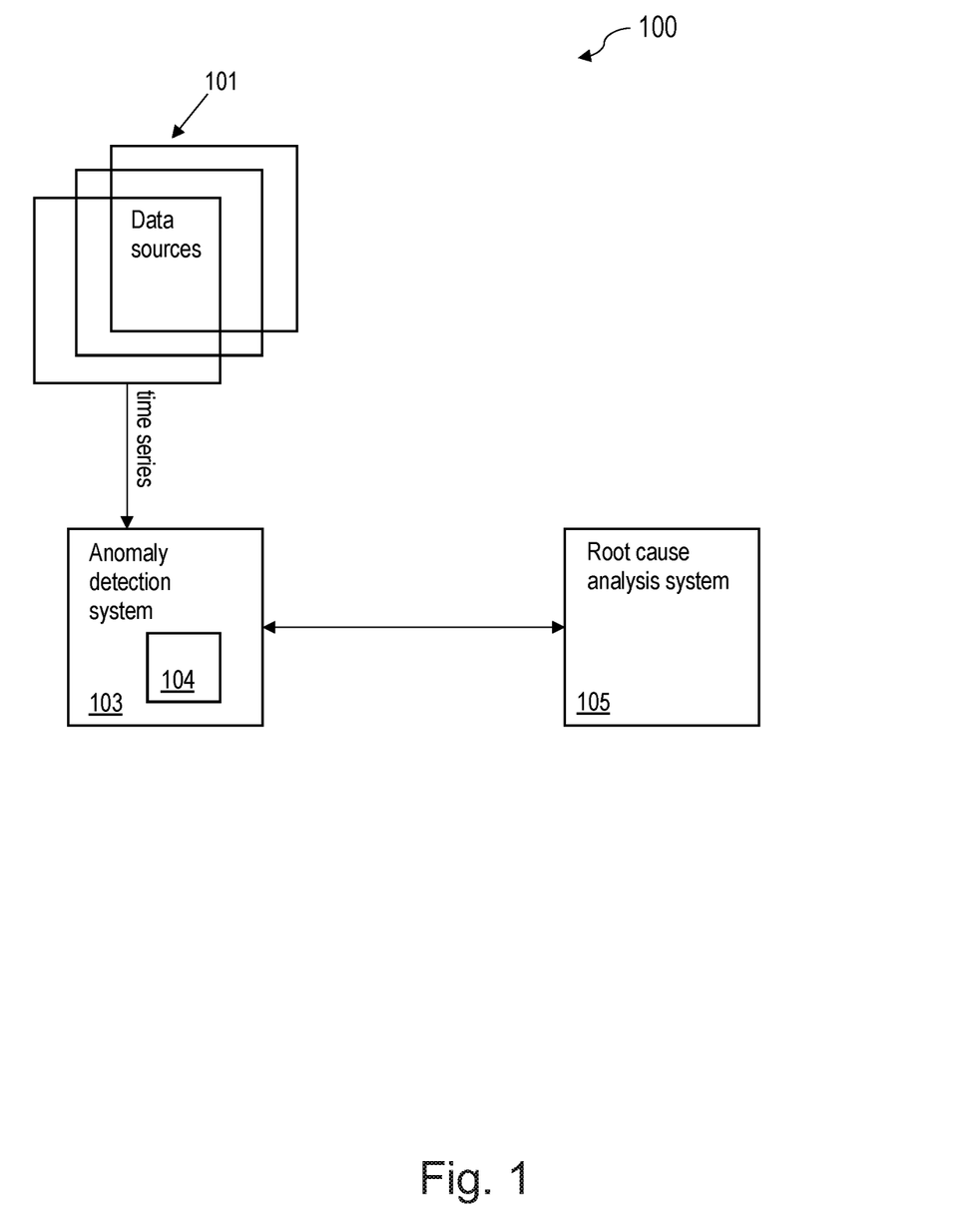
FIG. 1 is a block diagram of a computer system, in accordance with embodiments of the present invention.

FIG. 1 is a diagram of a computer system 100, in accordance with example embodiments of the present invention. The computer system 100 may comprise data sources 101. In example embodiments, each data source of the data sources 101 may be a computer system, and each data source of the data sources 101 is configured to transfer data over a network. For example, the data source may be a public or private cloud storage system, a storage system which is addressable via an URL over a network, or any other accessible data source. The data source may include data for one or more sensors. In various embodiments, the sensor may be a device, module, machine, or subsystem whose purpose is to determine and/or monitor values of measurands in the corresponding environment.

The sensor may collect or acquire measurements at regular or irregular time intervals. The measurements may be provided as a time series. The time series comprises a series of data points (or values) indexed (or listed or graphed) in time order (e.g. the time series comprises tuples of values and associated timestamps). A timestamp of a value (or data point) indicates the time at which the value is acquired. For example, the value of the time series may be a value of a measurand, where the measurand may be a physical quantity, condition, or property. Thus, each data source of the data sources 101 may provide a time series whose values are values of a measurand, such as the temperature, pressure, CPU usage, etc. In one example, the data sources 101 may provide sensor data of a first group of measurands (named 'GRP1').

The computer system 100 includes an anomaly detection system 103. The anomaly detection system 103 includes anomaly detection algorithm 104. In various embodiments, the anomaly detection algorithm 104 is configured to detect anomalies in data received from the data sources 101. In additional embodiments, the anomaly detection algorithm 104 may be configured to process received monitoring time series mts1, mts2, . . . mtsX. For example, the anomaly detection algorithm 104 can compare actual behavior of a measurand to a normal behavior of the measurand to produce comparison data. In one example, a predefined deviation from the normal behavior may indicate an anomaly. In another example, the anomaly may be caused by a memory outage when insufficient random-access memory (RAM) is available to accommodate data required to perform an operation.

In example embodiments, the anomaly detection algorithm may be configured to identify unexpected values of monitoring measurands (collectively named 'MON') of the received monitoring time series mts1, mts2, . . . mtsX. For example, the monitoring measurands MON can comprise at least part of measurands of the first group of measurands GRP1 and/or combinations of measurands of the first group of measurands GRP1 (e.g. the data sources may provide measurands such as temperature, pressure and CPU usage), while the monitoring measurands MON may comprise pressure, temperature and the ratio of temperature and pressure.

In one example, the AD algorithm 104 may be configured to detect that an anomaly has occurred when values of a measurand of an incoming sample falls outside of a normal value range. The bounds of this range can be referred to as thresholds. For example, a score can be computed using the residuals derived from the difference between the received values and reference values. The score may indicate an anomaly when the score falls above the highest first outlier or below the lowest first outlier of the range. Utilization of the score can enable identification of anomalous behavior by the extent of deviation from a normal model of the data.

In another example, the AD algorithm 104 may be an analytical method, such as a machine learning model. In example embodiments, the machine learning model may be an autoencoder. For example, the autoencoder may be a feedforward neural network. The autoencoder can include an input layer having a number of nodes corresponding with respective measurands, of the first group GRP1, of measurands. For example, the number of nodes in the input layer may be the number of measurands of the first group GRP1. The output layer may include the same number of nodes as the input layer and corresponding to the reconstructed values of the first group of measurands GRP1.

Various embodiments of the present invention can train the autoencoder network on data representing the normal behavior of the first group of measurands, with the goal of first compressing and then reconstructing the input variables. The training may include changing parameters values to minimize the reconstruction error. The training may be performed using a training dataset. Embodiments of the present invention can obtain the training dataset by collecting multiple metric data sets at multiple time. For example, one data set may be obtained from a respective device such as a SAN volume controller (SVC) device.

A metric may be a measurand. For example, the training set may be built using many devices at different time. Each device can provide a multidimensional time series. The autoencoder may be trained on multiple multidimensional time series (with multiple time windows). For example, only sets that have a node with 4 ports with 8 Gbps speed may be filtered. For each entity set, single host-node-ports entity sets may be extracted, and the 35 high priority and aggregate metrics may be filtered in one file, which may form the training set. During the dimensionality reduction, the network learns the interactions between the various variables and re-construct the variables back to the original variables at the output. If the data source degrades or has a problem, then embodiments of the present invention can identify an increased error in the network reconstruction of the input variables. By monitoring the reconstruction error, embodiments of the present invention can detect an anomaly.

The computer system 100 includes a root cause analysis system 105. The root cause analysis system 105 may be configured to generate a set of probable root causes for an anomaly detected by the anomaly detection system 103. The set of probable root causes may include one or more potential root causes of the anomaly.

The anomaly detection system 103, data sources 101 and the root cause analysis system 105 may be interconnected by one or more networks. In one example, the network comprises the Internet. In another example, the network comprises a wireless link, a telephone communication, a radio communication, or computer network (e.g. a Local Area Network (LAN) or a Wide Area Network (WAN)).

Figure 2:
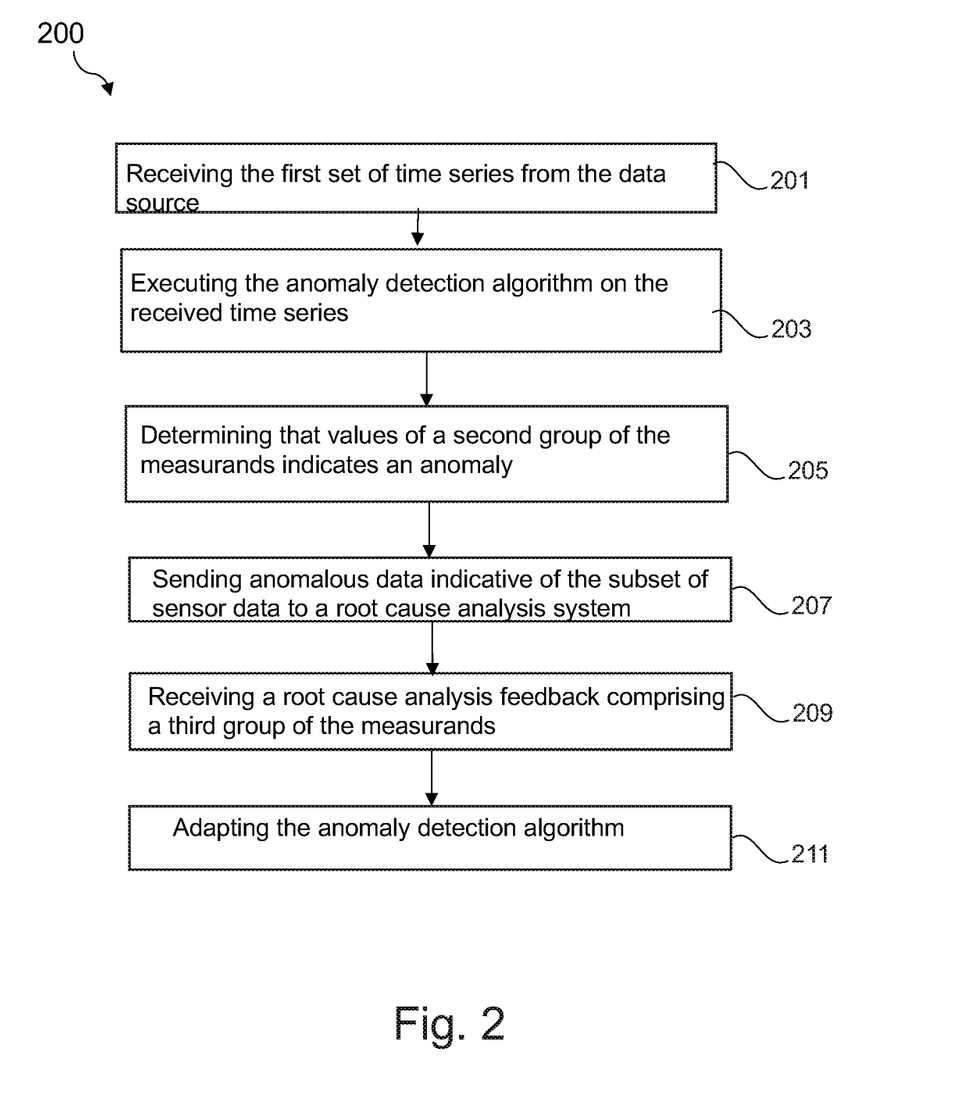
FIG. 2 is a flowchart of a method, in accordance with embodiments of the present invention.

FIG. 2 is a flowchart of a method 200, in accordance with example embodiments of the present invention. The method 200 may be an anomaly detection method. For the purpose of explanation, the method 200 may be implemented as processing steps for execution in the computer system 100 illustrated in previous FIG. 1, but is not limited to this implementation.

In step 210, method 200 receives a first set of time series from the data sources 101. In an embodiment, anomaly detection system 103 receives the first set of time series (named 'SET1'). The first set of time series may comprise time series ts1, ts2, . . . tsN. For example, the first set of time series may be streaming data that is continuously generated by the data sources 101.

Anomaly detection system 103 can incrementally process such data using the present method (e.g. without having access to all of the data). The incremental processing can enable a stream processing of the received data and thus a real-time monitoring of the sensor data to act on data in real time. For example, large generated or acquired amounts of data may need to be analyzed in real time so in order to facilitate acting on potential load balancing in the network. In another example, the first set of time series SET1 may be stored upon being received for performing an offline analysis of the received sensor data by the anomaly detection system.

In step 203, method 200 executes the anomaly detection algorithm on received monitoring time series. The monitoring time series mts1 . . . mtsX may comprise at least part of the time series of the first set SET1. In example embodiments, method 200 can execute the anomaly detection algorithm on time series mts1 . . . mtsX that are part of SET1. In an example scenario, time series mts1 and mts2 are being monitored or processed by the anomaly detection system. For example, the time series mts1 and mts2 may be used to monitor monitoring measurands MON1, MON2 and MON12. The time series mts1 has values of measurand MON1. The time series mts2 has values of measurand MON2 and MON12 is the sum of measurands MON1 and MON2. Accordingly, two time series are used to monitor three monitoring measurands.

For example, method 200 can execute the anomaly detection algorithm 104 on a predefined sample of data. The sample of data may incrementally be increased by each received data. Following the above example, method 200 receives and accumulates data of time series mts1 and mts2. The anomaly detection algorithm 104 may regularly be executed on accumulated data. For example, the anomaly detection algorithm 104 may be executed every hour so that for a current hour, the anomaly detection algorithm 104 is executed on data of the current hour and data accumulated in hours before the current hour. In another example, the sample of data may be data received in a given time interval and which was not previously processed (e.g. the anomaly detection algorithm 104 may incrementally process data received in each hour).

The anomaly detection algorithm 104 may be configured to determine if the values of monitoring measurands have a normal behavior or not. For example, the anomaly detection algorithm 104 may compare values of each of measurands MON1, MON2 and MON12 with respective normal behavior data. In another example, the values of each of measurands MON1, MON2 and MON12 may be input to a trained machine learning model (which is the anomaly detection algorithm 104) to predict if the values deviate from a normal behavior.

In addition, the anomaly detection algorithm may be configured to provide an anomaly score of a given monitoring measurand to indicate if the given monitoring measurand has anomalous values or does not have anomalous values. For example, the anomaly detection algorithm can determine the anomaly score may be based on the results of comparing the values of the given monitoring measurand and the reference values. The anomaly score may be weighted by a weight associated with the given monitoring measurand. The values of the weights of the monitoring measurands may be provided in accordance with a first order of the monitoring measurands (e.g. the first ordered monitoring measurand has the highest weight).

In step 205, method 200 can utilize the anomaly detection algorithm 104 to determine that values of a second group (e.g., GRP2) of one or more of the measurands of a subset of the received sensor data indicates an anomaly. In example embodiments, method 200 can perform step 205 using the determined anomaly scores. Following the above example, the anomaly detection algorithm 104 may determine that the values of MON1 in a given time range or time window (e.g. a morning hour), do not follow the normal behavior. The behavior determination indicates an anomaly in time series mts1 during the time window.

In step 207, method 200 can utilize the anomaly detection system to send anomalous data indicative of the subset of sensor data to a root cause analysis system. The anomaly detection system (e.g., anomaly detection system 103) may seek for a validation of its finding and/or for a more in-depth analysis results of the identified anomaly.

For example, the anomaly detection system may be configured to connect to multiple root analysis systems. For example, anomaly detection system 103 can connect to multiple instances of root analysis system 105 (one instance depicted). The anomaly detection system may select the root analysis systems in order to perform step 207 utilizing the selected root analysis system. The selection may for example be a random selection. In another example, the selected root cause analysis system may be the instance with more available resources than the other root analysis systems. In another example, each of the root systems may be configured to process certain types of measurands. The selected root cause analysis system may be the system that process the type of monitoring measurands of the second group GRP2. Following the above example, the selected root cause analysis system may be the system that processes the type of monitoring measurands that covers the measurand MON1.

In example embodiments, the anomalous data may comprise the time range during which the anomaly occurred and also an indication of the time series and/or monitoring measurands whose values have the anomaly. Following the above example, the anomalous data may comprise the time range during which the anomaly occurred and an indication of the time series mts1 and/or monitoring measurand MON1. The anomalous data may be provided in a predefined input format. The input format may be the format of input data of the root cause analysis system. In one example, the root cause analysis system may be updated using the anomalous data (e.g. a database of anomalies of the root cause analysis system may be updated by adding one or more entries to the database). The added entry is descriptive of the anomaly indicated in the anomalous data.

Using the anomalous data as input, the root cause analysis system may perform a diagnosis of the anomaly to accurately identify the origin of the anomaly, which allows the anomaly detection system to improve its anomaly detection algorithm for further usage.

In step 209, method 200 utilizes the anomaly detection system to receive a root cause analysis feedback from the root cause analysis system. The root cause analysis feedback is indicative of a result of a root cause analysis of the subset of sensor data. The root cause analysis feedback comprises a third group of the measurands GRP3. The measurands of the third group GRP3 may or may not be part of the second group GRP2. The root cause analysis feedback may further indicate a new time window for monitoring values of the measurands GRP3. The new time window may have been used by the root cause analysis system to find the root cause.

In step 211, method 200 adapts the anomaly detection algorithm. In example embodiments, the adaption is based on a difference between the third and second groups of measurands, such that the AD algorithm can identify unexpected values of at least the monitoring measurands. For example, method 200 can perform the adaptation so that the anomaly detection may be performed in the new time window for further received time series.

If the third group (e.g., GRP3) has the same measurands as the second group (e.g., GRP2), then method 200 can validate the detected anomaly and may indicate that the detection algorithm operates well. The adaptation of the anomaly detection algorithm may or may not be performed depending on whether an order of the measurands is considered. For example, the anomaly detection algorithm is a machine learning model that is configured to receive or process the monitoring measurands in accordance with the first order. The root cause analysis feedback may comprise the measurands of GRP3 in a second order. If the first and second orders of the measurands of GRP3 are the same, then the adaptation of the anomaly detection algorithm may not be performed. If the first and second orders of the measurands are different, then the machine learning model may be adapted so as to receive or process the monitoring measurands of GRP3 in accordance with the second order.

If the third group (e.g., GRP3) is a subgroup of the second group (e.g., GRP2), then method 200 can validate the detected anomaly. However, the determination may indicate that the detection algorithm needs to be adapted because of a falsely indicated anomaly in measurands that are not a root cause. In this example, the adaptation of the anomaly detection algorithm may be performed so as to adapt the anomaly detection rules for the measurands of the second group GRP2, which are not part of the third group GRP3. For example, thresholds may be released for those measurands of the second group GRP2 which are not part of the third group GRP3. For example, by adapting the thresholds of the measurands, and rerunning the adapted algorithm on the same subset of the received sensor data (of step 205), the new detected second group GRP2 of measurands may be the same as the third group GRP3.

If the third group (e.g., GRP3) has measurands that do not belong to the second group (e.g., GRP2) and are not monitored, then method 200 can adapt the anomaly detection algorithm to increase the number of monitoring measurands by the measurands of the third group (GRP3), which do not belong to the second group GRP2. If the third group GRP3 has measurands which do not belong to the second group (GRP2) and which are monitored, then method 200 can adapt the anomaly detection algorithm (e.g. by changing thresholds associated with those measurands).

In another example, if the anomaly detection algorithm is a machine learning model, then the adaptation of the anomaly detection algorithm may be performed by retraining the machine learning model. For example, a user may be requested to retrain the machine learning model. The training set of the machine learning model may be enhanced or increased so that a retraining may be performed to obtain a more accurate trained model.

In one example, method 200 can repeat steps 203 to 211 for further received time series data, where in each iteration, the root cause analysis feedback is received from the updated root cause analysis system. The number of repetitions may for example be user defined (e.g. 10 times) or the repetition may automatically be performed upon receiving further time series. The repetition may enable a mutual and dynamic adaptation of the root cause analysis system and the anomaly detection system. In various embodiments, steps 203 to 211 may be steps of the monitoring method.

Figure 3:
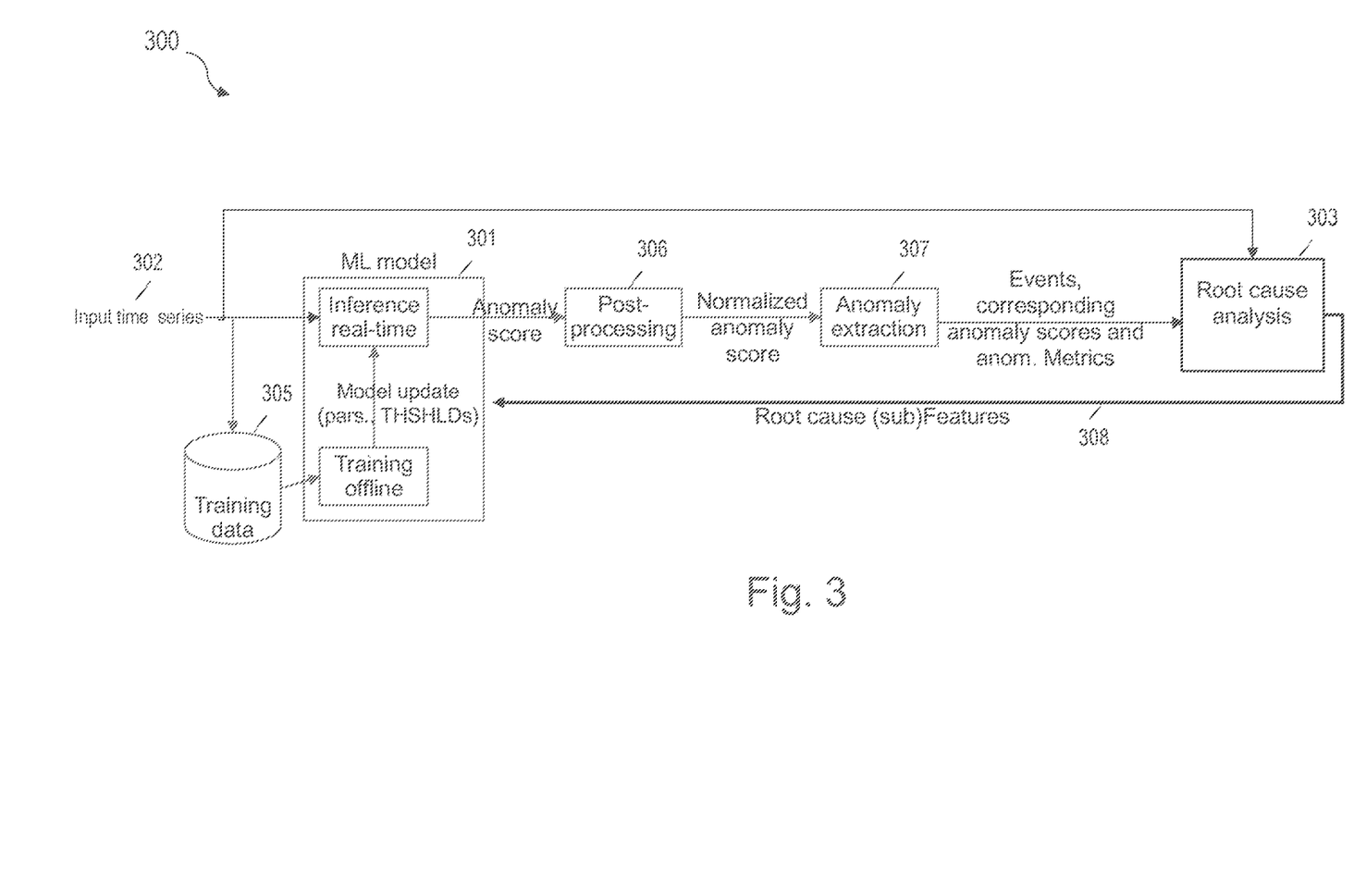
FIG. 3 is a diagram of a computer system, in accordance with embodiments of the present invention.

FIG. 3 is a diagram of a computer system 300, in accordance with example embodiments of the present invention. The computer system 300 includes an anomaly detection system 301 and a root cause analysis system 303. The anomaly detection system 301 may be configured to detect anomalies in received input time series 302 data using a machine learning model.

As indicated in FIG. 3, the machine learning model may be trained offline using training data 305. The trained machine learning model may be an unsupervised trained model. In example. Embodiments, the machine learning model can be an autoencoder. The autoencoder may be a type of artificial neural network used to learn efficient data coding in an unsupervised manner. The autoencoder may be a feed-forward neural network with parameters θ and may implement an encoding $f_{\hat{\theta}}$; and a decoding $g_{\hat{\theta}}$ function. For example, given an input data point $x_i$ (e.g. which may be a measurand of the first group of measurands GRP1) the autoencoder maps the given data point to a code $c_i$ and then outputs $y_i$, where $c_i = f_{\hat{\theta}}$; and $y_i = g_{\hat{\theta}}(f_{\hat{\theta}}(x_i))$. The output $y_i$ is the reconstruction of $x_i$ according to $c_i$ and θ.

In various embodiments, the autoencoder may be trained so as to minimize the difference of the input $x_i$ and the output $y_i$ in order to create accurate reconstructions. For example, the training phase tries to estimate the set of parameters θ that minimize the mean squared error over some subset of the set of normalized data points. The machine learning model may learn to encode/decode all data points with a lossy encoding, which can enable to model the general shape of the measurands.

In order for the autoencoder to model the inherent characteristics of normal traffic behavior, the autoencoder may be designed to be undercomplete. For example, the dimension of the code $c_i$ may be less than n (which may be the number of measurands which are inputs to the autoencoder), forcing the model to perform dimensionality reduction on the input. Learning an undercomplete representation may force the autoencoder to capture the most salient features of the training data, which, in the context of network traffic, is the form of the traffic most commonly encountered. Thus, the model may be able to accurately reconstruct data points that are close to the norm and may have a high reconstruction error on anomalous data points. This property may be used to calculate the anomaly score as the reconstruction error using the following formula: $\alpha(x_i) = \|g_{\hat{\theta}}(f_{\hat{\theta}} x_i)) - x_i\|^2$.

Various embodiments of the present invention can utilize the trained machine learning model for performing a real time inference. The inference comprises inputting time series data to the trained machine learning model and receiving from the trained machine learning model an output indicating that values of a second group of one or more of the measurands of a subset of the received sensor data indicates an anomaly. As illustrated in FIG. 3, embodiments of the present invention can utilize a model reconstruction error to provide an anomaly score for each input measurand of the trained machine learning model. Points (i.e., measurands) with a high reconstruction error (i.e., far from norm) are anomalies. Further embodiments of the present invention can perform post-processing 306 of the anomaly scores in order to obtain normalized anomaly scores. For example, the post-processing may be performed using a min-max scaler to re-scale the score to be in the range [0,1].

Using the normalized anomaly scores, embodiments of the present invention can perform an anomaly extraction 307. The anomaly extraction may provide a group of measurands with corresponding values that do not match the normal behavior. For example, anomalous data may be provided as a result of the anomaly extraction. The anomalous data may indicate the group of measurands and corresponding events. The anomalous data may be provided to the root cause analysis system 303.

As shown in FIG. 3, the root cause analysis system 303 may be configured to receive the time series 302 that are also received at the anomaly detection system 301. The root cause analysis system 303 may perform a root cause analysis for data that has anomaly. The root cause analysis system may determine another group of measurands, which are provided as feedback data to the anomaly detection system 301, as indicated by the arrow 308 linking the root cause analysis system and the anomaly detection system. Using the feedback data, embodiments of the present invention can adaptively modify the internal reduced representation of the machine learning model.

The present subject matter may enable a dynamically and automatically adaptable anomaly detection method. The present subject matter may improve anomaly detection based on real data (e.g. as data accumulates over time), the accuracy of the anomaly detection may increase. This may be advantageous because what may be viewed initially as an anomaly when the anomaly detection program is initiated, may later be revealed to be a deviation that is not abnormal. The anomaly detection may be performed in real-time and may utilize different anomaly detection techniques.

The present subject matter may seamlessly be integrated with existing root cause analysis systems. For example, the anomaly detection method may be performed with different root cause analysis systems. For example, after adapting the anomaly detection algorithm, the method may be repeated using the adapted anomaly detection algorithm and another root cause analysis system. This may further improve the accuracy of the anomaly detection based on different data and different feedbacks.

Figure 4:
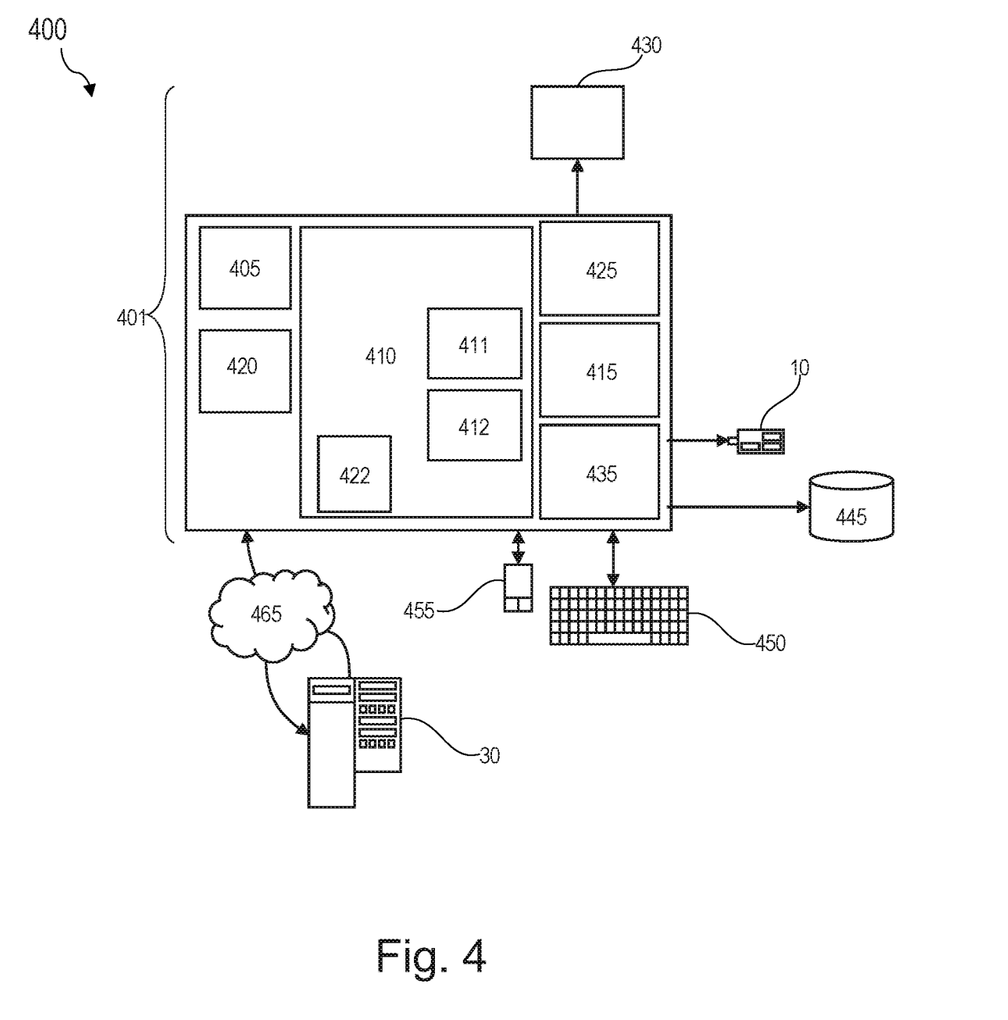
FIG. 4 represents a computerized system, suited for implementing one or more method steps, in accordance with embodiments of the present invention.

FIG. 4 represents a general computerized system 400 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 412, firmware 422, hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 410 coupled to a memory controller 415, and one or more input and/or output (I/O) devices or peripherals 10 and 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes instructions of software 412 (e.g., instructions to manage databases such as a database management system).

The software in memory 410 shall also typically include a suitable operating system (OS) 411. The OS 411 essentially controls the execution of other computer programs, such as possibly software 412 for implementing methods as described herein.

The methods described herein may be in the form of a source program of software 412, an executable program of software 412 (object code), script, or any other entity comprising a set of instructions to be performed (as an aspect of software 412). When a source program, then the program needs to be translated via a compiler, assembler, interpreter, or the like, which may or may not be included within the memory 410, so as to operate properly in connection with the OS 411. Furthermore, the methods can be written as an object-oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part, or all of the steps of the methods discussed herein. In exemplary embodiments, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (WLAN), a wireless wide area network (WWAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) (e.g., included in firmware 422). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software 412, as is shown in FIG. 4, the methods can be stored on any computer readable medium, such as storage 420, for use by or in connection with any computer related system or method. The storage 420 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for anomaly detection, the method comprising:
   receiving, by one or more processors, a first set of time series from a data source, wherein the data source provides sensor data and a timestamping of the sensor data as the first set of time series, the sensor data comprising values of a first group of measurands;
   identifying, by one or more processors, unexpected values of monitoring measurands in a monitored time series utilizing an anomaly detection algorithm;
   determining, by one or more processors, that values of a second group of one or more of the measurands of a subset of the received sensor data indicates an anomaly by executing the anomaly detection algorithm on the received time series;
   sending, by one or more processors, anomalous data indicative of the subset of sensor data to a root cause analysis system;
   receiving, by one or more processors, a root cause analysis feedback from the root cause analysis system, the root cause analysis feedback being indicative of a result of a root cause analysis of the subset of sensor data, the root cause analysis feedback comprising a third group of the measurands; and
   training, by one or more processors, the anomaly detection algorithm based on a difference between the third groups of measurands and the second groups of measurands to predict values of monitoring measurands deviating from a normal behavior.

2. The method of claim 1, wherein determining that values of a second group of one or more of the measurands of a subset of the received sensor data indicates an anomaly further comprises:
   detecting, by one or more processors, that an overall performance metric descriptive of the monitoring time series in a given time window indicates an anomaly, wherein the detecting includes:
      utilizing the received sensor data that is associated with respective timestamps within the time window for comparing the values of the monitoring measurands with respective reference values, the reference values of a monitoring measurand being indicative of a behavior of the monitoring measurand; and
   selecting, by one or more processors, based on comparison results, a subset of the measurands of the monitoring measurands with corresponding values that do not match the reference values, wherein the second group of measurands comprises at least part of said subset of measurands.

3. The method of claim 2, further comprising:
   ranking, by one or more processors, the subset of measurands in accordance with a level of respective differences with the reference values, wherein the second group of measurands comprises N highest ranked measurands.

4. The method of claim 1, wherein the training of the anomaly detection algorithm further comprises:
   configuring, by one or more processors, the anomaly detection algorithm to identify in the monitoring time series unexpected values of the monitoring measurands and one or more measurands of the third group which are not part of the second group of measurands.

5. The method of claim 1, wherein training of the anomaly detection algorithm further comprises:
   redefining, by one or more processors, reference values of measurands of the second group which are not part of the third group, the reference values of a monitoring measurand being indicative of a behavior of the monitoring measurand,
   wherein the anomaly detection algorithm is configured to use reference values of the monitoring measurands for identifying unexpected values.

6. The method of claim 1, wherein the anomaly detection algorithm comprises a machine learning model, and training the anomaly detection algorithm further comprises:
   retraining, by one or more processors, the machine learning model.

7. The method of claim 1, wherein training the anomaly detection algorithm further comprises:
   augmenting, by one or more processors, a number of monitoring time series to be processed by the anomaly detection algorithm.

8. The method of claim 1, wherein the anomalous data is indicative of a second set of time series and a time range covering timestamps of the subset of sensor data.

9. The method of claim 1, wherein a monitoring measurand of the monitoring measurands includes one of: (i) a measurand of the first group of measurands or (ii) a combination of measurands of the first group.

10. The method of claim 1, wherein each time series of the first set of time series includes values of a respective measurand.

11. The method of claim 1, further comprising:
updating, by one or more processors, a rules engine database of the root cause analysis system using the anomalous data.

12. A computer system for anomaly detection, the computer system comprising:
one or more computer processors;
one or more computer readable storage media; and
program instructions stored on the computer readable storage media for execution by at least one of the one or more processors, the program instructions comprising:
program instructions to receive a first set of time series from a data source, wherein the data source provides sensor data and a timestamping of the sensor data as the first set of time series, the sensor data comprising values of a first group of measurands;
program instructions to identify unexpected values of monitoring measurands in a monitored time series utilizing an anomaly detection algorithm;
program instructions to determine that values of a second group of one or more of the measurands of a subset of the received sensor data indicates an anomaly by executing the anomaly detection algorithm on the received time series;
program instructions to send anomalous data indicative of the subset of sensor data to a root cause analysis system;
program instructions to receive a root cause analysis feedback from the root cause analysis system, the root cause analysis feedback being indicative of a result of a root cause analysis of the subset of sensor data, the root cause analysis feedback comprising a third group of the measurands; and
program instructions to train the anomaly detection algorithm based on a difference between the third groups of measurands and the second groups of measurands to predict values of monitoring measurands deviating from a normal behavior.

13. The computer system of claim 12, wherein the program instructions to determine that values of a second group of one or more of the measurands of a subset of the received sensor data indicates an anomaly further comprise program instructions to:
detect that an overall performance metric descriptive of the monitoring time series in a given time window indicates an anomaly, wherein the detecting includes:
utilizing the received sensor data that is associated with respective timestamps within the time window for comparing the values of the monitoring measurands with respective reference values, the reference values of a monitoring measurand being indicative of a behavior of the monitoring measurand; and
select based on comparison results, a subset of the measurands of the monitoring measurands with corresponding values that do not match the reference values, wherein the second group of measurands comprises at least part of said subset of measurands.

14. The computer system of claim 13, further comprising program instructions, stored on the computer readable storage media for execution by at least one of the one or more processors, to:
rank the subset of measurands in accordance with a level of respective differences with the reference values, wherein the second group of measurands comprises N highest ranked measurands.

15. The computer system of claim 12, wherein the program instructions to train the anomaly detection algorithm further comprise program instructions to:
configure the anomaly detection algorithm to identify in the monitoring time series unexpected values of the monitoring measurands and one or more measurands of the third group which are not part of the second group of measurands.

16. The computer system of claim 12, wherein the program instructions to train the anomaly detection algorithm further comprise program instructions to:
redefine reference values of measurands of the second group which are not part of the third group, the reference values of a monitoring measurand being indicative of a behavior of the monitoring measurand,
wherein the anomaly detection algorithm is configured to use reference values of the monitoring measurands for identifying unexpected values.

17. The computer system of claim 12, wherein the anomaly detection algorithm comprises a machine learning model, and the program instructions to train the anomaly detection algorithm further comprise program instructions to:
retrain the machine learning model.

18. The computer system of claim 12, wherein the program instructions to train the anomaly detection algorithm further comprise program instructions to:
augment a number of monitoring time series to be processed by the anomaly detection algorithm.

19. The computer system of claim 12, wherein the anomalous data is indicative of a second set of time series and a time range covering timestamps of the subset of sensor data.

20. A computer program product for anomaly detection, the computer program product comprising:
one or more computer readable storage media and program instructions stored on the one or more computer readable storage media, the program instructions comprising:
program instructions to receive a first set of time series from a data source, wherein the data source provides sensor data and a timestamping of the sensor data as the first set of time series, the sensor data comprising values of a first group of measurands;
program instructions to identify unexpected values of monitoring measurands in a monitored time series utilizing an anomaly detection algorithm;
program instructions to determine that values of a second group of one or more of the measurands of a subset of the received sensor data indicates an anomaly by executing the anomaly detection algorithm on the received time series;
program instructions to send anomalous data indicative of the subset of sensor data to a root cause analysis system;
program instructions to receive a root cause analysis feedback from the root cause analysis system, the root cause analysis feedback being indicative of a result of a root cause analysis of the subset of sensor data, the root cause analysis feedback comprising a third group of the measurands; and program instructions to train the anomaly detection algorithm based on a difference between the third groups of measurands and the second groups of measurands to predict values of monitoring measurands deviating from a normal behavior.

* * * * *